(12) United States Patent
Maser

(10) Patent No.: US 9,739,417 B2
(45) Date of Patent: Aug. 22, 2017

(54) GREASE GUN

(71) Applicant: Frank Maser, Gütersloh (DE)

(72) Inventor: Frank Maser, Gütersloh (DE)

( * ) Notice: Subject to any disclaimer, the term of this patent is extended or adjusted under 35 U.S.C. 154(b) by 0 days.

(21) Appl. No.: 14/848,949

(22) Filed: Sep. 9, 2015

(65) Prior Publication Data

US 2016/0076698 A1 Mar. 17, 2016

(30) Foreign Application Priority Data

Sep. 12, 2014 (EP) .................................. 14184528
May 5, 2015 (DE) .................... 20 2015 102 298 U

(51) Int. Cl.
*G01F 11/00* (2006.01)
*F16N 3/12* (2006.01)

(52) U.S. Cl.
CPC ..................................... *F16N 3/12* (2013.01)

(58) Field of Classification Search
CPC ........................................................ F16N 3/12
USPC ....... 222/252–263, 325–327; 184/24, 28, 37, 184/105.2
See application file for complete search history.

(56) References Cited

U.S. PATENT DOCUMENTS

| | | | | |
|---|---|---|---|---|
| 1,996,792 A | * | 4/1935 | Bystricky | ................. F16N 3/12 222/372 |
| 2,872,085 A | * | 2/1959 | Mueller | ............... F02M 37/103 222/256 |
| 3,187,959 A | * | 6/1965 | Morehouse | ............... F16N 3/12 222/256 |
| 3,246,802 A | * | 4/1966 | Fuhrmann | ................. F16N 3/12 222/494 |
| 3,246,804 A | * | 4/1966 | Fuhrmann | ................. F16N 3/12 222/183 |
| 3,393,840 A | * | 7/1968 | Sundholm | ................. F16N 3/12 222/256 |
| 4,560,095 A | * | 12/1985 | Shew | ........................ F16N 3/12 222/256 |
| 5,044,471 A | * | 9/1991 | Machek | .................... F16N 3/12 184/105.2 |
| 5,918,702 A | * | 7/1999 | Cheng | ............... B05C 17/00569 184/105.2 |
| 6,467,579 B1 | * | 10/2002 | Simon | ....................... F16N 3/12 184/105.2 |
| 2012/0074177 A1 | * | 3/2012 | Gillam | .................... F16N 21/06 222/563 |

FOREIGN PATENT DOCUMENTS

| | | | |
|---|---|---|---|
| CN | 2204367 | * | 8/1995 |
| CN | 2204367 Y | | 8/1995 |

(Continued)

OTHER PUBLICATIONS

Machine Translation of CN 2204367, www.espacenet.org.*

*Primary Examiner* — Jeremy W Carroll
(74) *Attorney, Agent, or Firm* — Richard M. Goldberg

(57) ABSTRACT

A grease gun having a press head (12), a barrel (14) detachably coupled to the press head, a connector (26) formed at the press head for connecting a cartridge (18) that is accommodated in the barrel (14), and a support (28) for supporting the cartridge (14), the support being formed at the barrel in a rear end portion facing away from the press head (12), wherein a spring (30) which biases the cartridge against the press head (12) is provided between the support (28) and the rear end of the cartridge (18).

10 Claims, 7 Drawing Sheets

(56) References Cited

FOREIGN PATENT DOCUMENTS

| DE | 1160243 | 12/1963 |
|----|---------|---------|
| DE | 202013102560 U1 | 10/2014 |
| FR | 1301773 | 7/1962 |
| FR | 2749194 A1 | 12/1997 |

* cited by examiner

GREASE GUN

BACKGROUND OF THE INVENTION

The invention relates to a grease gun having a press head, a barrel detachably coupled to the press head, a connector formed at the press head for connecting a cartridge that is accommodated in the barrel, and a support for supporting the cartridge, the support being formed at the barrel in a rear end portion facing away from the press head.

A handlebar-type grease gun of this type has been described in FR 1 301 773. The press head includes a self-priming high pressure piston pump the piston of which is connected to the handlebar such that grease is squeezed out through a discharge opening under high pressure when the handlebar is pivoted against the barrel. During a return stroke of the piston, when the handlebar is pivoted away from the barrel, new grease is sucked-in from the cartridge. The cartridge has a tubular casing that is open at its rear end and in which there is guided a follow-up piston which encloses the grease in the cartridge and slides towards the press head due to the suction pressure created by the press head as the cartridge is increasingly being emptied. At its rear portion, the barrel forms a support in the form of a crimp which is abutted directly by the cartridge. The position of the support has been selected such that it holds the cartridge in a position in which it sealingly engages the press head.

DE 20 2013 102 560 U1 describes a grease gun in which the cartridge has a neck portion that faces the connector and is surrounded by a shoulder of the cartridge. An output opening of the cartridge is defined by the neck portion which is sealingly received in the connector of the press head.

SUMMARY OF THE INVENTION

It is an object of the invention to provide a more versatile grease gun.

In order to achieve this object, a spring which biases the cartridge against the press head is provided between the support and the rear end of the cartridge.

This has the advantage that it is possible to use cartridges of different lengths, while it is still assured that the cartridge engages the press head.

Useful details and further embodiments of the invention are indicated in the dependent claims.

In an advantageous embodiment, the grease gun has a piston rod and an integrated follow-up piston, so that the grease gun may also be used without cartridge. In one embodiment, the piston rod is detachable, so that it does not interfere with the cartridge when a cartridge is being used. In another embodiment, the piston rod has an acute tip, so that the piston rod may pierce the follow-up piston of the cartridge. In this case, the follow-up piston of the cartridge may be pierced and may then be slid along the piston rod even when the follow-up piston of the cartridge does not have a pre-perforated brake point.

In one embodiment, the connector comprises an annular collar which surrounds a neck portion of the cartridge but is radially spaced therefrom and sealingly engages a shoulder of the cartridge. In this embodiment, the cartridge may be coupled gas-tightly to the press head, so that a suction pressure for sucking-in the grease may be created, even when the neck portion of the cartridge does not form a smooth sealing surface.

BRIEF DESCRIPTION OF THE DRAWINGS

Embodiment examples will now be described in conjunction with the drawings, wherein.

DETAILED DESCRIPTION

Figure 1:
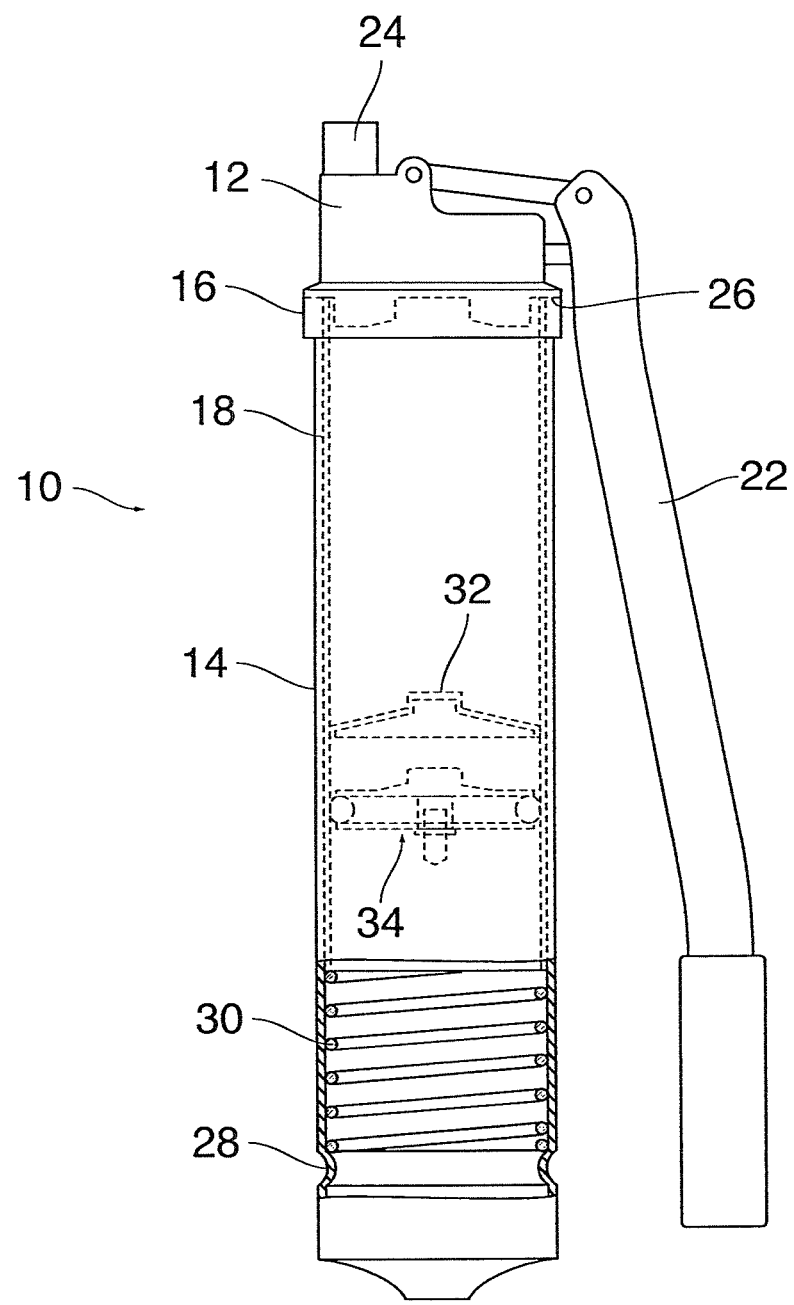
FIG. 1 is a view of a grease gun according to the invention.

The grease gun 10 shown in FIG. 1 has a press head 12 to which a detachable barrel 14 has been coupled, e.g. by means of a screw-thread 16. The barrel 14 accommodates a cartridge 18 that contains a certain supply of grease.

As is generally known in the art, the press head 12 includes a self-priming high pressure piston pump 20 (FIG. 3) which is operated by means of a handlebar 22. When the handlebar 22 is pivoted from the position shown in FIG. 1 in the direction away from the barrel 14, grease is sucked-in from the cartridge 18, and when the handlebar is then pivoted again in the direction approaching the barrel, the grease that has been sucked-in is squeezed out under high pressure through an outlet opening 24 of the grease gun.

The cartridge 18 has a tubular plastic casing that is open at both its front and rear ends and sealingly engages, with its front end, a plane sealing surface of a connector 26 formed at the press head 12.

The barrel 14 has, in the vicinity of its rear end, a peripheral crimp that forms a support 28 for a spring 30, in this example a helical compression spring that has been machined to have plane-parallel end faces. The spring 30 abuts the support 28 and engages the internal peripheral surface of the barrel 14 almost without play. Its front end presses upon the open rear end of the cartridge 18 so that the front end of the cartridge is biased with a certain force against the sealing surface of the connector 26 and thereby sealingly engages this surface so as to establish a tight connection between the interior of the cartridge and the piston pump 20.

When the cartridge 18 is to be replaced, the barrel 14 is screwed off from the press head 12. The cartridge 18 may then simply be withdrawn and be replaced by a new cartridge filled with grease. When the barrel 18 is then thrust over the cartridge and is tightened, a tight connection between the cartridge and the piston pump 20 is automatically reestablished, even when the length of the new cartridge is different from the length of the previous cartridge. In this way, the grease gun according to the invention may be utilized with cartridges of different brands.

In the example shown, the cartridge 18 has a follow-up piston 32 that is formed by a plastic disk and is guided for sliding movement in the tubular part of the cartridge 18. A known type of cartridge is closed by a detachable lid at the front end and has at the rear end a multi-purpose lid which is secured at the casing with a peripheral pull-off fastening tape. When the fastening tape has been pulled off, the multi-purpose lid may be utilized as follow-up piston 32.

When the front lid has been removed, the supply of grease in the cartridge fills essentially the entire space between the connector 26 and the follow-up piston 32. When grease is sucked out of the cartridge 18 by the action of the self-priming piston pump, the atmospheric pressure acting upon the outward side of the follow-up piston 32 causes the same to move towards the press head.

FIG. 1 further illustrates an integrated follow-up piston which permits a different way of utilizing the grease gun 10, as will now be explained in conjunction with FIG. 2.

Figure 2:
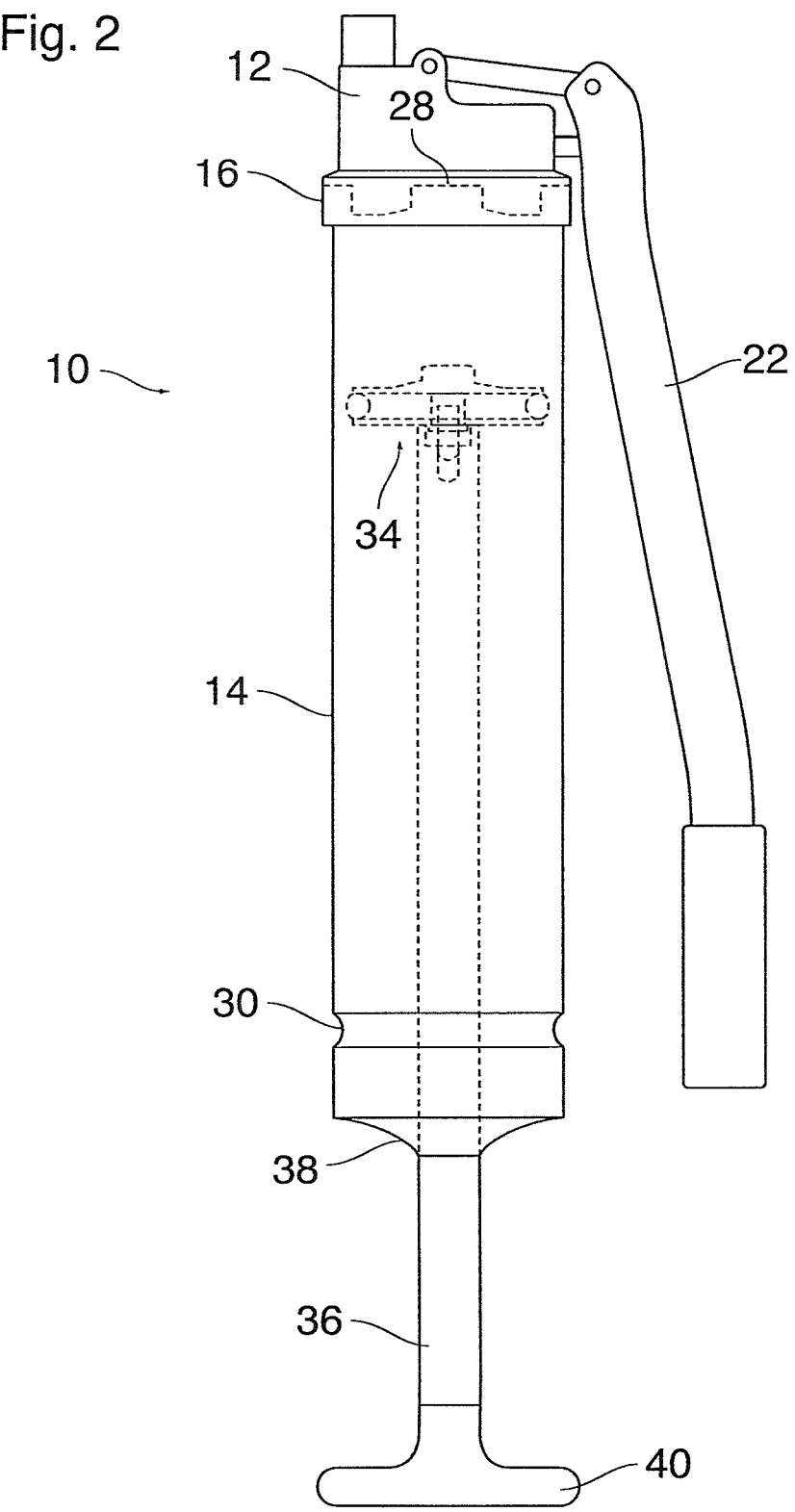
FIG. 2 is a view of the grease gun of FIG. 1 in a modified configuration.

In FIG. 2, the grease gun is used without cartridge 18. The integrated follow-up piston 34 is detachably mounted to an end of a piston rod 36 which passes coaxially through the interior of the barrel 14 and is slideably guided in an end cap 38 at the rear end of the barrel. A detachable handle 40 has been screwed onto the end of the piston rod 36 outside of the barrel 14.

In order to fill the grease gun with grease in the configuration shown in FIG. 2, the barrel 14 is screwed off from the press head 12, the follow-up piston 34 is withdrawn into the rear end position by means of the handle 40, and grease is filled into the barrel 14, for example in a tear open package. Subsequently, the press head 12 is screwed-on again, so that the grease may be sucked-in by the piston pump 20. A helical spring (not shown) which slightly biases the follow-up piston 34 towards the press head 12 may be provided in the space between the end cap 38 and the follow-up piston 34, so that the follow-up movement of the piston is assisted when the grease gun is being emptied.

The integrated follow-up piston 34 has an elastic seal the outer diameter of which is adjustable, as will be explained later. In this way, the follow-up piston 34 may be adjusted such that it may optionally fit into the barrel 14 (FIG. 2) or may fit into and be slideable in the cartridge 18 (FIG. 1).

Figure 3:
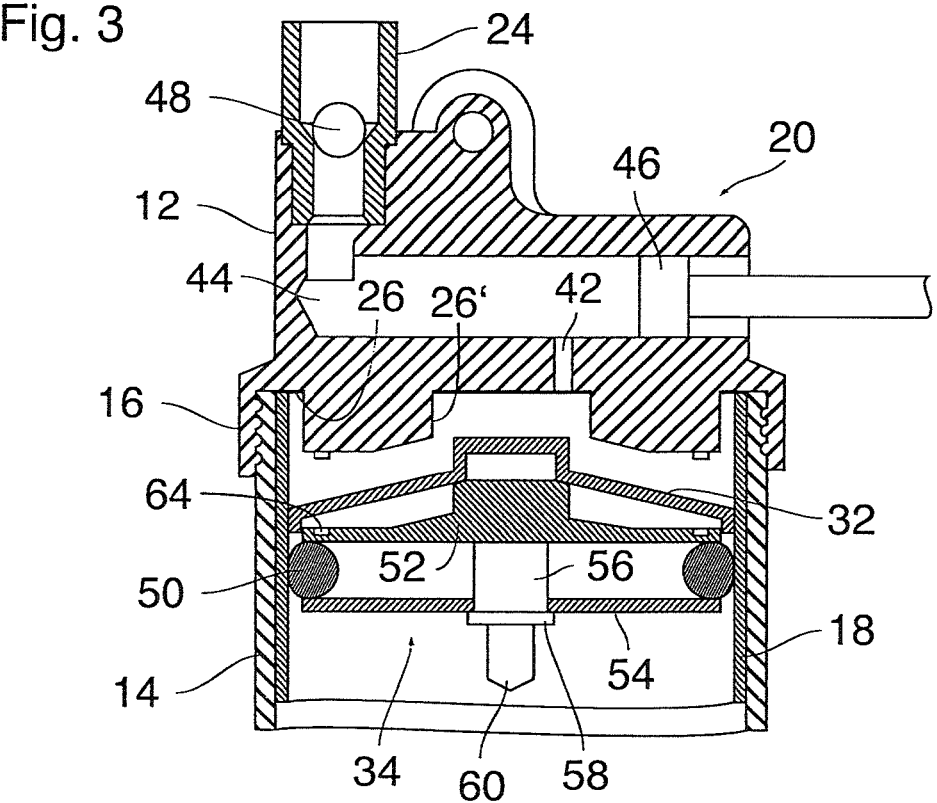
FIG. 3 is an enlarged axial sectional view of a press head of the grease gun in the configuration shown in FIG. 1.

In FIG. 3, the press head 12 and the adjacent end of the barrel 14 have been shown in an enlarged axial sectional view. What has been shown here is the configuration according to FIG. 1 with the cartridge 18 inserted, specifically a condition in which the cartridge has been emptied completely and, consequently, the follow-up piston 32 of the cartridge as well as the integrated follow-up piston 34 of the grease gun are located at the front end of the cartridge.

As can be seen in FIG. 3, the connector 26 has a cylindrical recess 26' inside of the annular sealing surface. A bore 42 connects the recess 26' to a cylinder 44 in which a piston 46 of the high-pressure piston pump 20 is slideable. When the piston 46 moves to the right in FIG. 3, grease is sucked-in via the bore 42 and the recess 26'. When the piston moves to the left beyond the position of the bore 42, the grease enclosed in the cylinder 44 is squeezed out under high pressure via the outlet opening 24 and a check valve 48.

The integrated follow-up piston 34 has a peripheral elastic squeeze seal 50 held between two disks 52, 54. The disk 54 is slideable in axial direction on a bolt 56 that projects from the disk 52 and, in FIG. 3, the disk 54 engages a collar 58 of this bolt, so that a maximal spacing exists between the disks 52 and 54 and the squeeze seal 50 is compressed only slightly and has a correspondingly small outer diameter, so that the follow-up piston 34 can easily be moved inside the cartridge 18.

In the portion projecting beyond the collar 58, the bolt 56 forms a threaded portion 60 with smaller diameter which serves for connecting the bolt to the piston rod 36.

Figure 4:
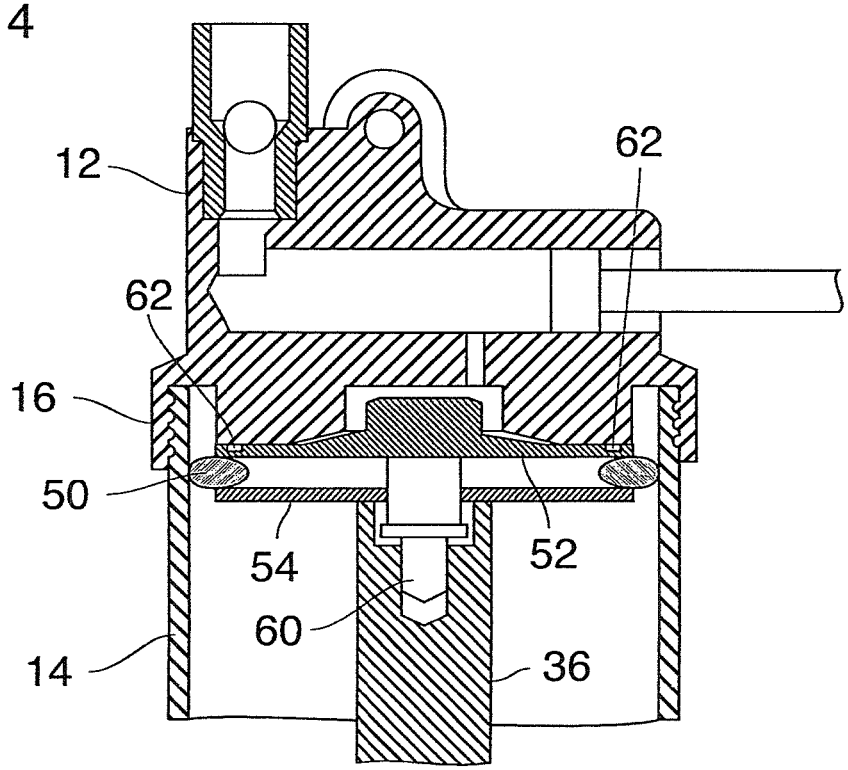
FIG. 4 is a sectional view analogous to FIG. 3, but for the configuration according to FIG. 2.

FIG. 4 shows the grease gun in the configuration according to FIG. 2, i.e. without the cartridge 18 and without the cartridge follow-up piston 32. Here, the squeeze seal 50 has been squeezed stronger between the disks 52 and 54 and has therefore a larger outer diameter, so that it sealingly engages the internal surface of the barrel 14. The spacing between the disks 52 and 54 may be adjusted as desired by rotating the piston rod 36 about its longitudinal axis while an anti-twist mechanism prevents the disk 52 from being rotated, so that the threaded portion 60 of the bolt 56 is screwed deeper into a corresponding threaded bore in the end of the piston rod 36 or is screwed out therefrom. The anti-twist mechanism is activated by pushing the disk into abutment at the press head 12 and then rotating it until cams 62 formed at the press head 12 (FIG. 4) engage into corresponding notches 64 (FIG. 3) in the disk 52.

In the same way, the piston rod 36 may also be totally screwed off from the bolt 56 so as to establish the configuration shown in FIGS. 1 and 3. When the grease gun is used with the cartridge 18 in the configuration according to FIGS. 1 and 3 and the integrated follow-up piston 34 is pushed to the rear end of the barrel while the cartridge is inserted, the operation of the grease gun is not compromised by the piston rod 36 which would otherwise project a long distance out of the rear end of the grease gun.

The embodiment example that has been described above may be modified in many ways.

For example, the connection between the cartridge and the piston pump 20 does not have to be formed by a plane sealing surface at the press head, as in FIG. 3. Instead, the press head may form an annular seal which seals at the peripheral edge of the cartridge when the cartridge is pressed against the press head by the spring 30. It is also possible to conceive of a threaded neck of the cartridge that is pressed into an annular groove or into the recess 26' of the press head.

Figure 5:
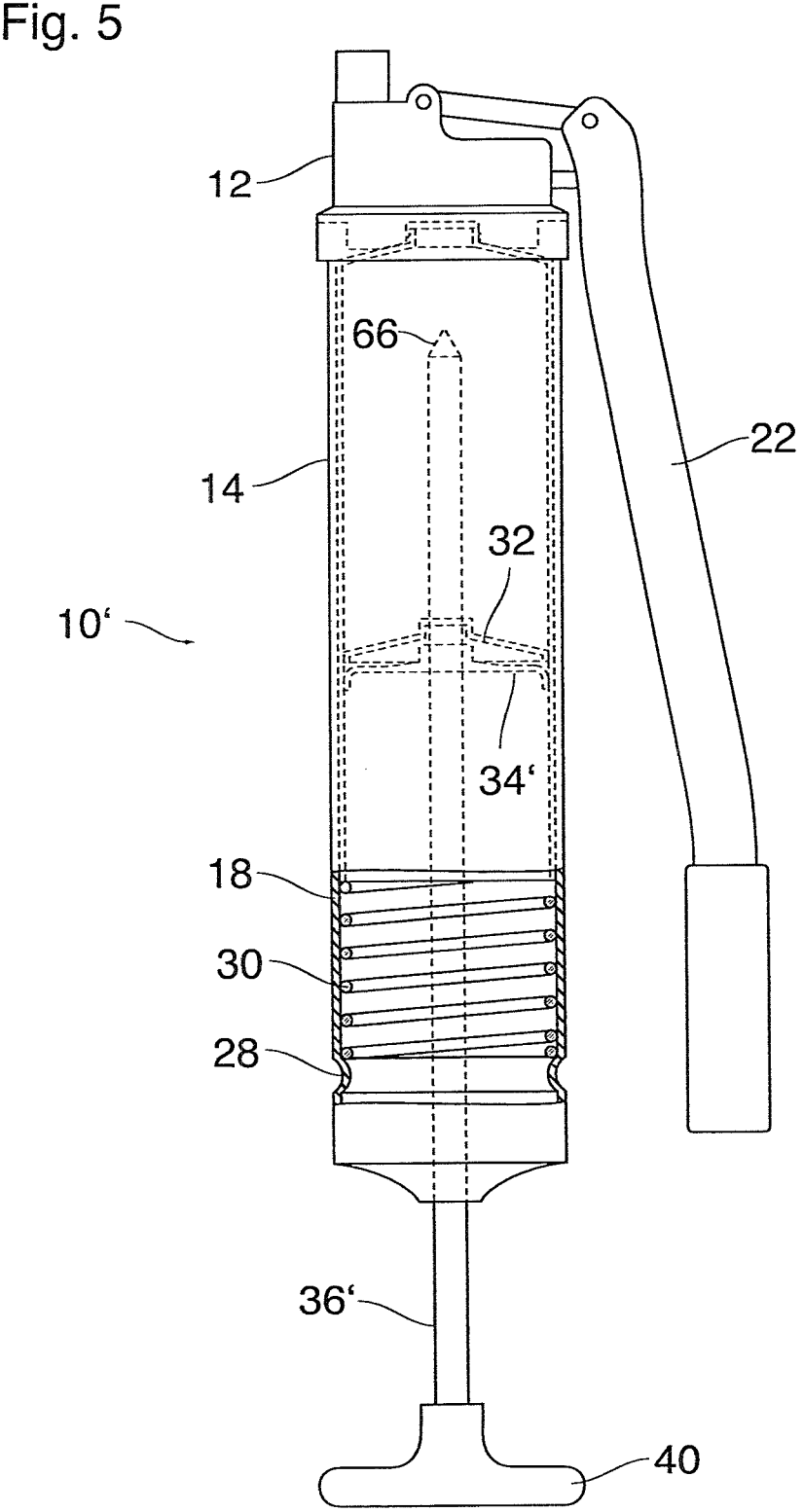
FIG. 5 is a view of a grease gun according to a modified embodiment.
Figure 6:
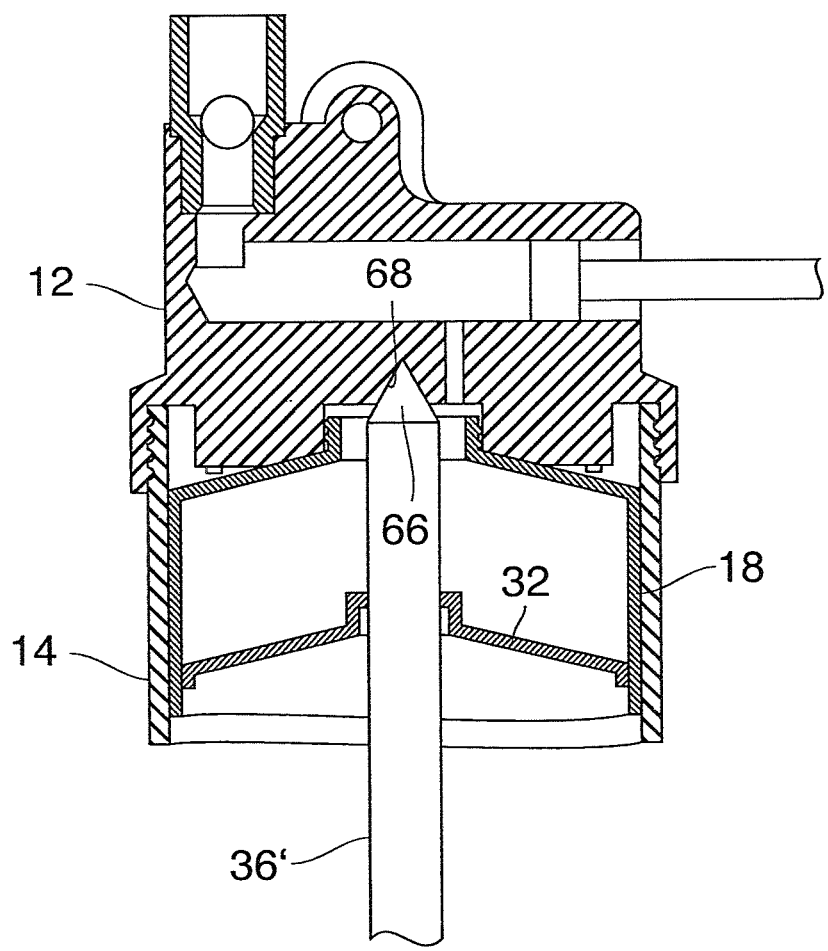
FIG. 6 is an enlarged axial sectional view of the press head of the grease gun shown in FIG. 5.

FIGS. 5 and 6 show a grease gun 10' according to another embodiment example. In this embodiment, it is not necessary to detach the piston rod in the configuration in which the cartridge 18 is used. Instead, this grease gun has a piston rod 36' with an acute tip 66 which can pierce the follow-up piston 32 of the cartridge.

An integrated follow-up piston 34' is slidable on the piston rod 36'. The integrated follow-up piston 34' is in this case formed by an elastic disk having sufficient elasticity for adapting to the different internal diameters of the cartridge 18 and the barrel 14.

When the cartridge 18 has been inserted into the barrel 14 and the barrel has been screwed onto the press head 12, a light blow onto the handle 40 causes the tip 66 to pierce the follow-up piston 32 of the cartridge. In all commercial cartridges, the follow-up piston is formed by a comparatively thin plastic disk which can be pierced in this way without requiring a weakening or a rated break point of the follow-up piston 32. The piston rod 36' is then inserted completely, until the tip 66 is received in a corresponding recess 68 of the press head, as has been shown in FIG. 6.

Figure 7:
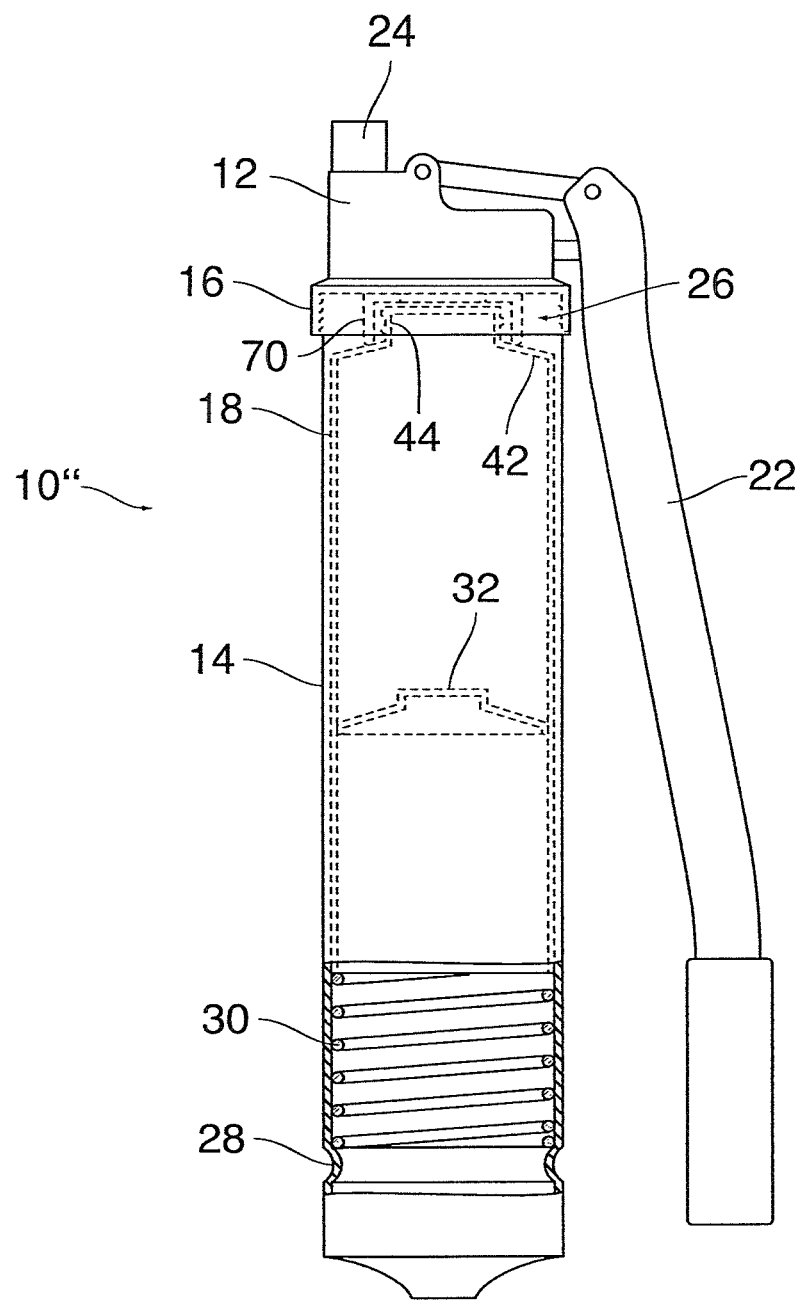
FIG. 7 is a view of a grease gun according to another embodiment of the invention, with a cartridge received therein.

FIG. 7 shows an example of a grease gun 10" which differs from the grease gun shown in FIG. 1 in the design of the connector 26. The press head 12 and the adjacent end of the barrel 14 have been shown in an enlarged sectional view in FIG. 8. The connector 26 comprises an annular collar 70 attached to the press head 12 by means of an adhesive or press fit.

The cartridge 18, at the end facing the press head 12, forms a peripheral conical shoulder 72 tapering towards a cylindrical neck portion 74 which defines an outlet opening of the cartridge. The neck portion 74 has an external screw-thread 76 which, when the cartridge is used in combination with certain types of grease guns, permits the neck portion to be screwed into a screw-thread connector of the press head. The length (preferably more than 10 mm) and the diameter (preferably more than 30 mm) of the collar 70 have been selected such that the collar can completely accommodate the neck portion 74 and surround it with radial spacing. Thus, a gas-tight connection between the piston pump 20 and the cartridge 18 is established by engagement of a rounded rim 78 of the collar 70 at the shoulder 72. The rim 78, which may also be configured as a knife-edge, is in contact with the shoulder 72 only along a circular line of contact. This permits to tightly couple the cartridge to the press head even in case of cartridges wherein the peripheral rim at the end of the neck portion 74 is not smooth but is interrupted by gaps or notches, for example. The spring 30 assures that the cartridge is pressed against the collar 70 with sufficient force. Since a radial spacing exists between the external screw-thread 76 of the neck portion and the collar 70, no frictional resistance will diminish the force with which the cartridge is pressed against the collar.

Figure 8:
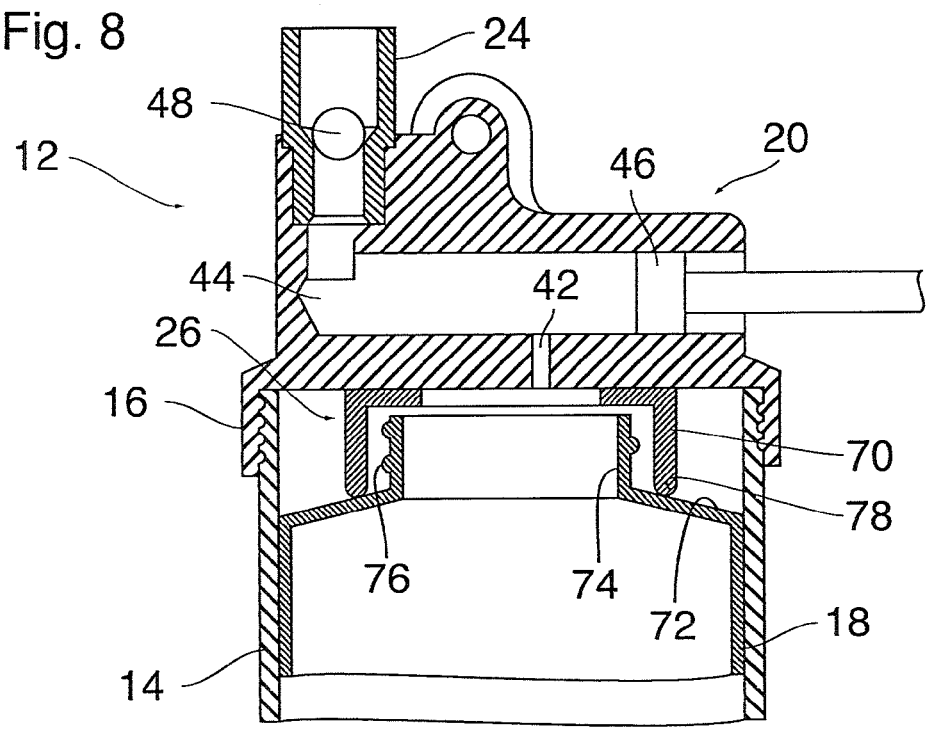
FIG. 8 is an enlarged axial sectional view of the press head of the grease gun shown in FIG. 7.

The press head 12 shown in FIG. 8 may be used not only with cartridges of the type that has been shown in FIG. 8, but may also be combined with various other types of cartridge.

Figure 9:
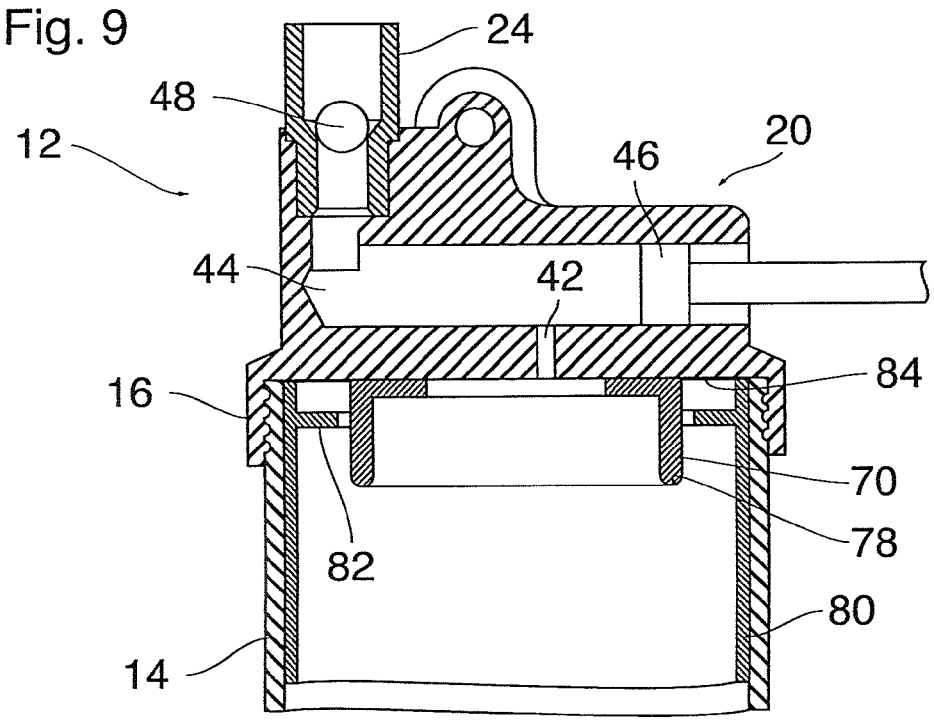
FIG. 9 is a sectional view analogous to FIG. 7, illustrating the use of the grease gun with a cartridge having a different design.

FIG. 9 shows the press head combined with a cartridge 80 having a different design, which, instead of the neck portion and the shoulder, has an end wall 82 which is slightly recessed from the rim of the cartridge. The end wall forms an outlet opening with a diameter of 36 or 37.5 mm. The outer diameter of the collar 70 is less than 35 mm, so that the collar may project through the outlet opening. A sealing effect is achieved in this case by engagement of the outer rim of the cartridge at a smooth sealing surface 84 formed radially outward of the collar 70.

What is claimed is:

1. A grease gun comprising:
   a press head,
   a barrel detachably coupled to the press head,
   a connector formed at the press head for connecting a cartridge that is adapted to be accommodated in the barrel, the cartridge having a peripheral wall and a front end, the connector having a sealing surface,
   a support for supporting the cartridge, the support being formed at the barrel in a rear end portion facing away from the press head, and
   a spring adapted to bias the cartridge against the press head, the spring being positioned in the barrel between the support and the rear end of the peripheral wall of the cartridge, with one end of the spring engaging the peripheral wall of the cartridge and biasing, via the peripheral wall, the front end of the cartridge against the sealing surface of the connector, thereby to establish a tight connection between the cartridge and the press head.

2. The grease gun according to claim 1, wherein the press head has an annular sealing surface at which an open front end of the cartridge is held in abutment by the spring.

3. The grease gun according to claim 1, further comprising a piston rod arranged coaxially in the barrel and a follow-up piston guided in the barrel.

4. The grease gun according to claim 3, wherein the piston rod is detachable from the barrel.

5. The grease gun according to claim 4, wherein the piston rod is adapted to be uncoupled from the follow-up piston of the grease gun.

6. The grease gun according to claim 5, wherein the follow-up piston of the grease gun has a seal with an adjustable outer diameter.

7. The grease gun according to claim 3, wherein the piston rod has an acute tip configured to pierce a disk-shaped follow-up piston of the cartridge.

8. The grease gun according to claim 1, wherein the cartridge has a neck portion surrounded by a shoulder, and the connector has an annular collar which is adapted to surround the neck portion of the cartridge with radial spacing and sealingly engage the shoulder.

9. The grease gun according to claim 8, wherein the collar has an outer diameter of not more than 36 mm.

10. The grease gun according to claim 8, wherein the collar has a rim shaped to contact the shoulder of the cartridge only on a circular line.

* * * * *